(12) United States Patent
Letocart (10) Patent No.: US 8,004,739 B2
(45) Date of Patent: Aug. 23, 2011

(54) CONTROL DEVICE FOR AT LEAST ONE ELECTROCHROMIC WINDOW AND METHOD FOR ACTIVATING THE SAME

(75) Inventor: Philippe Letocart, Raeren (BE)

(73) Assignee: Saint-Gobain Glass France, Aubervillers (FR)

( * ) Notice: Subject to any disclaimer, the term of this patent is extended or adjusted under 35 U.S.C. 154(b) by 0 days.

(21) Appl. No.: 12/920,001

(22) PCT Filed: Mar. 21, 2009

(86) PCT No.: PCT/EP2009/002095
§ 371 (c)(1),
(2), (4) Date: Oct. 27, 2010

(87) PCT Pub. No.: WO2009/124647
PCT Pub. Date: Oct. 15, 2009

(65) Prior Publication Data
US 2011/0063708 A1 Mar. 17, 2011

(30) Foreign Application Priority Data

Apr. 10, 2008 (DE) .......................... 10 2008 018 149

(51) Int. Cl.
*G02F 1/15* (2006.01)
*G02F 1/153* (2006.01)
(52) U.S. Cl. ........ 359/265; 359/275; 359/601; 359/604; 359/609; 700/19
(58) Field of Classification Search .......... 359/265–275, 359/257, 258, 601–604, 608, 609; 340/815.4; 156/107; 700/2, 3, 19, 20; 250/214 C; 205/80, 118, 122
See application file for complete search history.

(56) References Cited

U.S. PATENT DOCUMENTS

| | | | |
|---|---|---|---|
| 4,832,468 A | 5/1989 | Ito et al. | |
| 5,384,653 A * | 1/1995 | Benson et al. | 359/270 |
| 5,805,330 A * | 9/1998 | Byker et al. | 359/265 |
| 5,985,486 A | 11/1999 | Giron | |
| 6,297,900 B1 * | 10/2001 | Tulloch et al. | 359/275 |
| 6,433,913 B1 * | 8/2002 | Bauer et al. | 359/265 |
| 6,567,708 B1 | 5/2003 | Bechtel et al. | |
| 7,130,101 B2 * | 10/2006 | Rukavina et al. | 359/265 |
| 2007/0047089 A1 | 3/2007 | Mardirossian | |
| 2007/0285759 A1 | 12/2007 | Ash et al. | |

OTHER PUBLICATIONS

PCT International Search Report for PCT/EP2009/002095 filed on Mar. 21, 2009 in the name of Saint-Gobain Glass France, et al.
International Preliminary Report on Patentability for PCT/EP2009/002095 filed Mar. 21, 2009 in the name of Saint-Gobain Glass France.

* cited by examiner

*Primary Examiner* — Loha Ben
(74) *Attorney, Agent, or Firm* — Steinfl & Bruno LLP (57) ABSTRACT

The invention relates to a control device for at least one electrochromic window (100, 100.1, 100.2, 100', . . . ) with means (106, 108) for generating a charging current, to bring the window from a first state into a second state, wherein the window is darker in the second state than in the first state, means (112, 116) for discharging the window, to bring the window from the second state into the first state, wherein the discharging of the window can be triggered by an emergency signal (S1, S2).

3 Claims, 6 Drawing Sheets

CONTROL DEVICE FOR AT LEAST ONE ELECTROCHROMIC WINDOW AND METHOD FOR ACTIVATING THE SAME

CROSS REFERENCE TO RELATED APPLICATIONS

The present application is the US national stage of International Application PCT/EP2009/002095 filed on Mar. 21, 2009 which, in turn, claims priority to German Application DE 102008018149.8, filed on Apr. 10, 2008.

BACKGROUND

The prior art discloses different types of electrochromic windows, which are distinguished from one another by the type of electrolyte that is used: the electrolyte may, for example, take the form of a polymer or a gel or be formed as an inorganic layer. If the electrolyte is in solid form, they are also referred to as "all-solid" electrochromic windows. Such all-solid electrochromic windows are known per se, for example from U.S. Pat. No. 5,985,486.

Furthermore, US 2007/0285759 A1 discloses a control device for activating the electrochromic windows of a means of transport, such as for example an aircraft, a bus or a railway carriage. The control device has a user interface, which enables a user to set the degree of darkening of the window.

SUMMARY OF THE INVENTION

The invention is accordingly based on the objects of providing an improved control device for at least one electrochromic window, a control system for one or more electrochromic windows, a means of transport and a method of activating at least one electrochromic window.

The objects on which the invention is based are respectively achieved by the features of the independent patent claims. Embodiments of the invention are specified in the dependent patent claims.

According to embodiments of the invention, a control device for at least one electrochromic window is provided. The control device has means for generating a charging current, to bring the window from a first state into a second state, wherein the window is darker in the second state than in the first state, i.e., the window has a lower transmittance in the second state than in the first state.

To initiate this electrochromic effect, the window is therefore subjected to a charging current, in that for example a supply voltage is applied. Once the window has been brought into the second state, generally only a small current flows, to keep the window in the second state, wherein this small current serves to compensate for the leakage currents inherent in the window.

The control device also has means for discharging the window, to bring the window from the second state into the first state, wherein the discharging of the window can be triggered by an emergency signal.

This is particularly advantageous for applications of embodiments of the control device according to the invention for means of transport, such as for example aircraft, in particular passenger aircraft, motor vehicles, such as for example lorries, passenger cars or buses, rail vehicles, watercraft and the like.

An "emergency signal" is understood according to the invention as meaning any signal that indicates an emergency, such as for example a serious operational malfunction of the means of transport that is picked up by a sensor or a signal that is manually input. The absence of a signal that is normally present or recurs periodically may also represent an emergency signal according to the invention, as can a failure of the operating voltage of the control device, in particular a failure of its voltage source.

The invention is based here on the realization that, when an emergency situation occurs with respect to the operation of such a means of transport, it is advantageous from aspects of safety that the at least one electrochromic window of the means of transport, which in normal operation is darkened to a greater or lesser extent, i.e., is in the second state, is brought as quickly as possible into the first, non-darkened state, in order to permit optimum visibility.

For example, the cockpit glazing of a passenger aircraft in normal operation is activated such that the cockpit glazing is in the second state, i.e., is darkened to a greater or lesser extent. This is advantageous for the pilot from aspects of comfort and ergonomics, for example as a guard against glare in the case of strong sunlight. However, the invention is based on the realization that, when an emergency situation occurs, such aspects of comfort and ergonomics must be set aside and that in such an emergency situation maximum visibility is advantageous from aspects of safety. This is made possible by the means for discharging the window, which are formed in such a way that the discharging of the window can be triggered by an emergency signal.

According to one embodiment of the invention, the means for discharging the window are formed so as to produce a short-circuit, by way of which the discharging of the window takes place.

On the basis of the short-circuit, the discharging, and consequently the transition from the second state into the first state, can take place much more quickly than if, for example, merely the supply voltage is switched off. If merely the supply voltage is switched off, the discharging generally takes place by way of leakage currents. Such gradual discharging on the basis of leakage currents can take up to about an hour, in the case of large panes even up to several days, whereas the discharging by way of the short-circuit takes place within an extremely short time, i.e. within just a few seconds, for example within at most two seconds, preferably in less than one second, and in the case of large panes preferably within 10 seconds to 100 seconds.

According to one embodiment of the invention, the means for discharging are formed in such a way that, to discharge the window, a discharging voltage source is applied to the window. The direction of the discharging voltage is in this case chosen such that the voltage resulting from the voltage of the discharging voltage source and the charging voltage of the window is greater than the charging voltage, so that the charge of the window flows away by way of the discharging voltage source still more quickly than would be the case on the basis of the charging voltage alone. The discharging time can therefore be further shortened with the aid of the discharging voltage source.

According to one embodiment of the invention, the means for discharging have switching means, in order to interconnect first and second window regions electrically in such a way as to obtain a resulting voltage which is greater than the individual charging voltages. For example, the charging voltage resulting from the sum of the individual charging voltages is obtained. The discharging current for discharging the first and second window regions can then, for example, flow away more quickly by way of a short-circuit on the basis of the resulting charging voltage than would have been the case on the basis of the individual charging voltages. Therefore, the discharging time can also be further shortened in this way.

According to one embodiment of the invention, the first and second window regions are on the same electrochromic window. The first and second window regions may, however, also be formed on two or more different electrochromic windows, for example on electrochromic windows adjacent to one another.

According to one embodiment of the invention, the control device has a user interface for the emergency signal to be triggered by a user. For example, the user interface has an operating element, such as for example an emergency button, which the user can actuate in order to input into the control device the existence of an emergency situation. In response, the control device generates the emergency signal, to trigger the discharging of the window.

Alternatively or in addition, the control device may have means for detecting an emergency situation, which are formed so as to generate the emergency signal. For example, one or more sensors are connected to the control device, wherein the sensors supply data with regard to the current operating state of the means of transport. If this data indicates the existence of an emergency situation, the emergency signal is generated to discharge the windows.

For example, a so-called pre-crash sensor may be coupled to the control device. Such a pre-crash sensor emits a pre-crash signal when an imminent collision of the means of transport with an obstacle is predicted by the pre-crash sensor. Such a pre-crash signal is then used by the control device as an emergency signal to trigger the discharging of the window.

In a further aspect, the invention relates to a control system for a number of electrochromic windows. The control system has a number of control devices according to the invention, wherein each of the control devices is assigned to one electrochromic window or to a group of electrochromic windows. A control unit may communicate with the control devices over a communication channel, such as for example a data bus. The control unit is formed in such a way that it can transmit the emergency signal to the control devices over the communication channel, so that the electrochromic windows go over from their second states into the first state.

In a further aspect, the invention relates to a method of activating at least one electrochromic window, in particular of a means of transport. The method has the following steps: reception of an emergency signal; discharging of the at least one window, wherein the discharging is triggered by the emergency signal.

According to embodiments of the method according to the invention, the discharging may take place by way of a short-circuit or a discharging voltage source.

BRIEF DESRIPTION OF DRAWINGS

Embodiments of the invention are explained in more detail below with reference to the drawings, in which.

Elements of the following figures that correspond to one another are identified by the same reference numerals.

DESCRIPTION OF THE EMBODIMENTS

Figure 1:
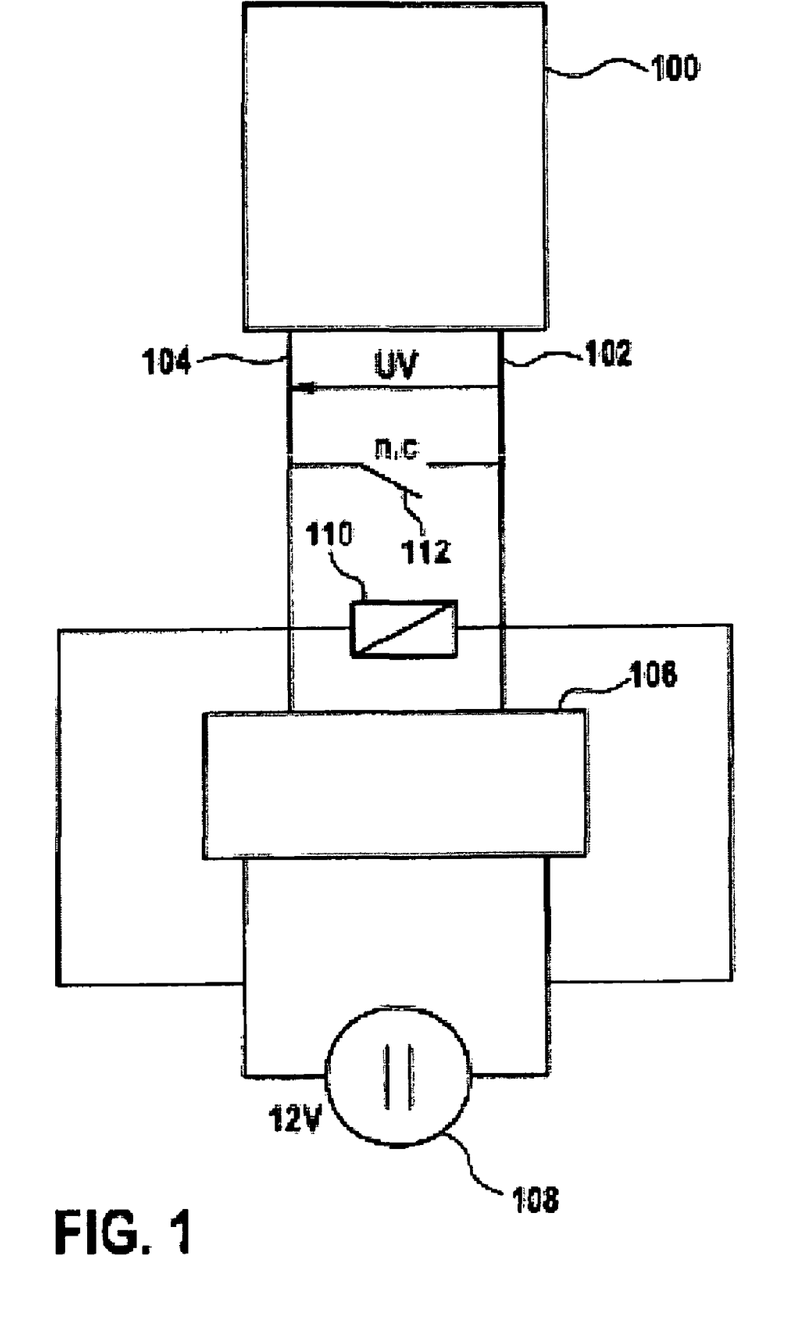
FIG. 1 shows a block diagram of a first embodiment of a control device according to the invention.

FIG. 1 shows an electrochromic window 100. The electrochromic window 100 may be, for example, a cockpit window of an aircraft, in particular of a passenger aircraft, the windscreen of a motor vehicle, the glazing of the driver's cab of a locomotive or the like.

The electrochromic window 100 has connections 102 and 104. When the electrochromic window 100 is discharged, and there is no voltage between the connections 102 and 104, it is in its first state, i.e., it is not darkened. On the other hand, when a supply voltage UV is applied between the connections 102 and 104, a charging current flows, which triggers the electrochromic effect, so that the window 100 is brought into its second, darkened state. The degree of darkening of the window 100 in the second state may be fixed or be adjustable by way of the voltage UV.

In the case of the embodiment under consideration here, the supply voltage UV is supplied by a circuit 106, which for its part is fed by a voltage source 108, of for example 12 V DC. The circuit 106 may, for example, be an electronically controlled power supply.

The voltage source 108 also serves for supplying current to the operating coil of a relay 110. The relay 110 is formed in such a way that its switch 112 is open, as shown in FIG. 1, as long as current is applied to its operating coil.

Therefore, when the voltage source 108 is switched off, the switch 112 is closed, whereas, when the voltage source 108 is switched on, the switch 112 is open.

In normal operation, the voltage source 108 is switched on, so that the switch 112 is therefore open and the supply voltage UV can be applied between the connections 102 and 104, to bring the window 100 into its second state and keep it there. In the case of an emergency, the voltage source 108 is switched off by a corresponding emergency signal, so that the switch 112 is closed, and consequently a short-circuit forms between the connections 102 and 104. The discharging current then flows by way of this short-circuit for the rapid discharging of the window 100, so that the latter immediately returns to its first state.

Figure 2:
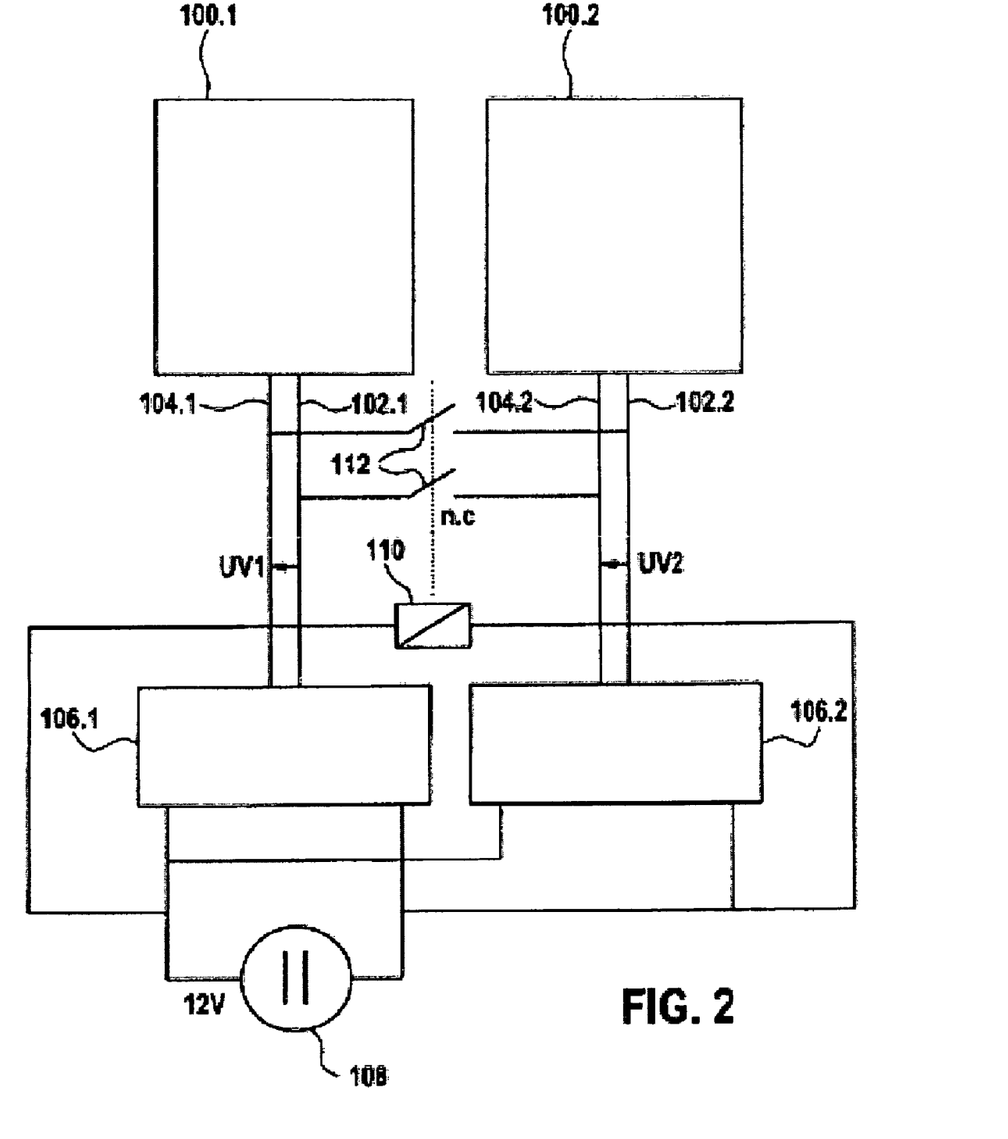
FIG. 2 shows a block diagram of a second embodiment of a control device according to the invention.

FIG. 2 shows a further embodiment of a control device according to the invention. In the case of this embodiment, the electrochromic window has a first electrochromic window region 100.1 and a second electrochromic window region 100.2. The window regions 100.1 and 100.2 have corresponding connections 102.1, 104.1 and 102.2 and 104.2, respectively, to which the supply voltages UV1 and UV2, respectively, can be applied. The supply voltage UV1 is supplied by the circuit 106.1 and the supply voltage UV2 is supplied by the circuit 106.2. Both circuits 106.1 and 106.2 are supplied with voltage by the voltage source 108.

In a normal operating state, the operating coil of the relay 110 is supplied with current by the voltage source 108, as is also the case in the embodiment of FIG. 1. As a result, the switches 112 are opened, so that the supply voltages UV1 and UV2 can be applied to the window regions 100.1 and 100.2, respectively.

Figure 3:
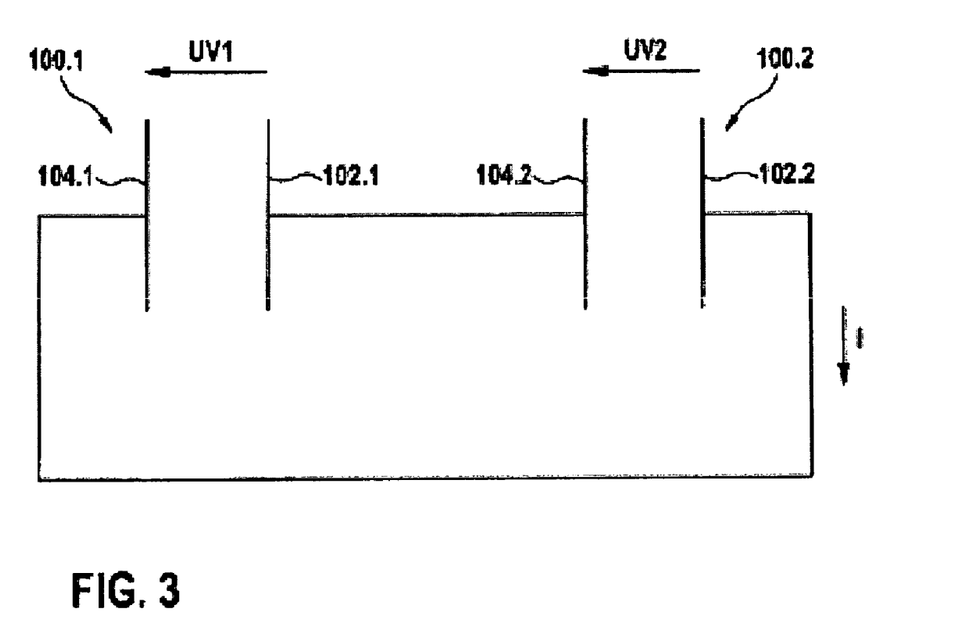
FIG. 3 shows an equivalent circuit diagram of FIG. 2 with respect to the discharging current.

If the voltage source 108 is switched off on account of an emergency signal, the switches 112 are closed, so that the equivalent circuit diagram shown in FIG. 3 is obtained with a view to the flowing away of the discharging current I. This is so because, on account of the antiparallel connection of the window regions 100.1 and 100.2, immediately after the closing of the switches 112 the supply voltages UV1 and UV2 add together to form the resulting voltage U=UV1+UV2, which causes the discharging current. On the basis of the short-circuit formed by the switches 112, this discharging current I quickly flows away, so that the window regions 100.1 and 100.2 go over into their first state within a short time, for example in the range of seconds.

Figure 4:
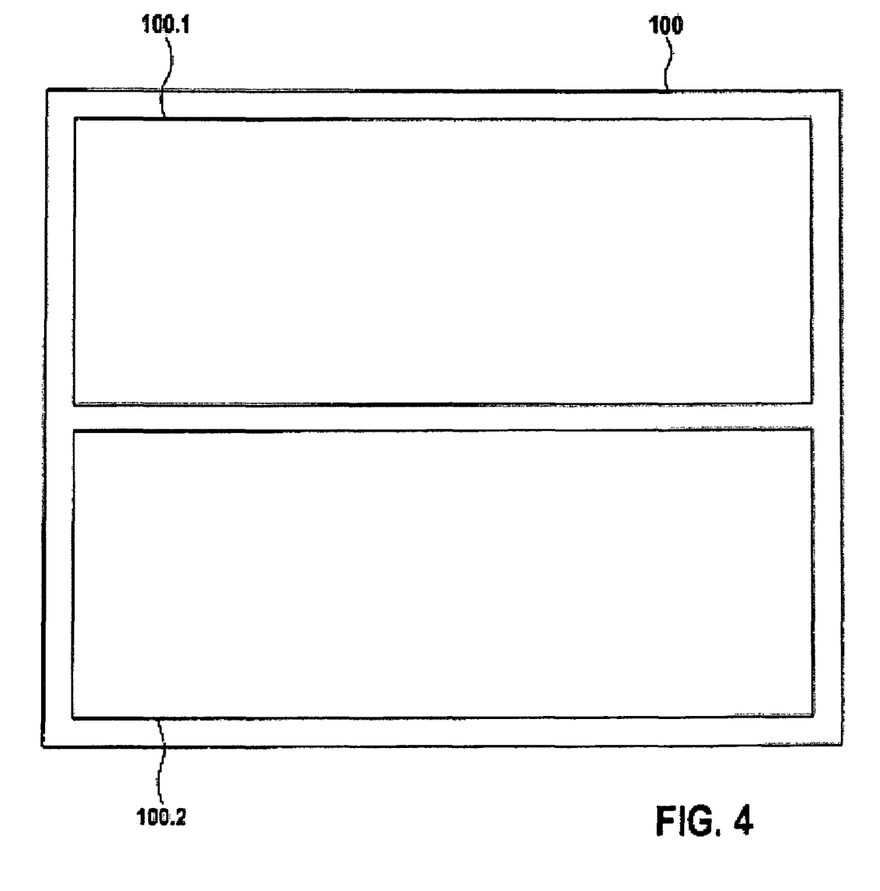
FIG. 4 shows a schematic plan view of an electrochromic window with first and second window regions.

FIG. 4 shows an embodiment of the electrochromic window 100, which has the window regions 100.1 and 100.2 (cf. the embodiment of FIG. 2). The window regions 100.1 and 100.2 may, however, also be respectively formed by a single electrochromic window, wherein then, for example, two electrochromic windows located next to each other are interconnected with the aid of the circuit according to FIG. 2.

Instead of the relay 110 shown in the embodiments of FIGS. 1 and 2, a semiconductor switch may also be used, such as for example a field-effect transistor, in particular a MOSFET of the depletion type (depletion type MOSFET), for example of the "normally on" type. This is so because a semiconductor switch of the "normally on" type is closed when there is no voltage at its control electrode (gate electrode).

Figure 5:
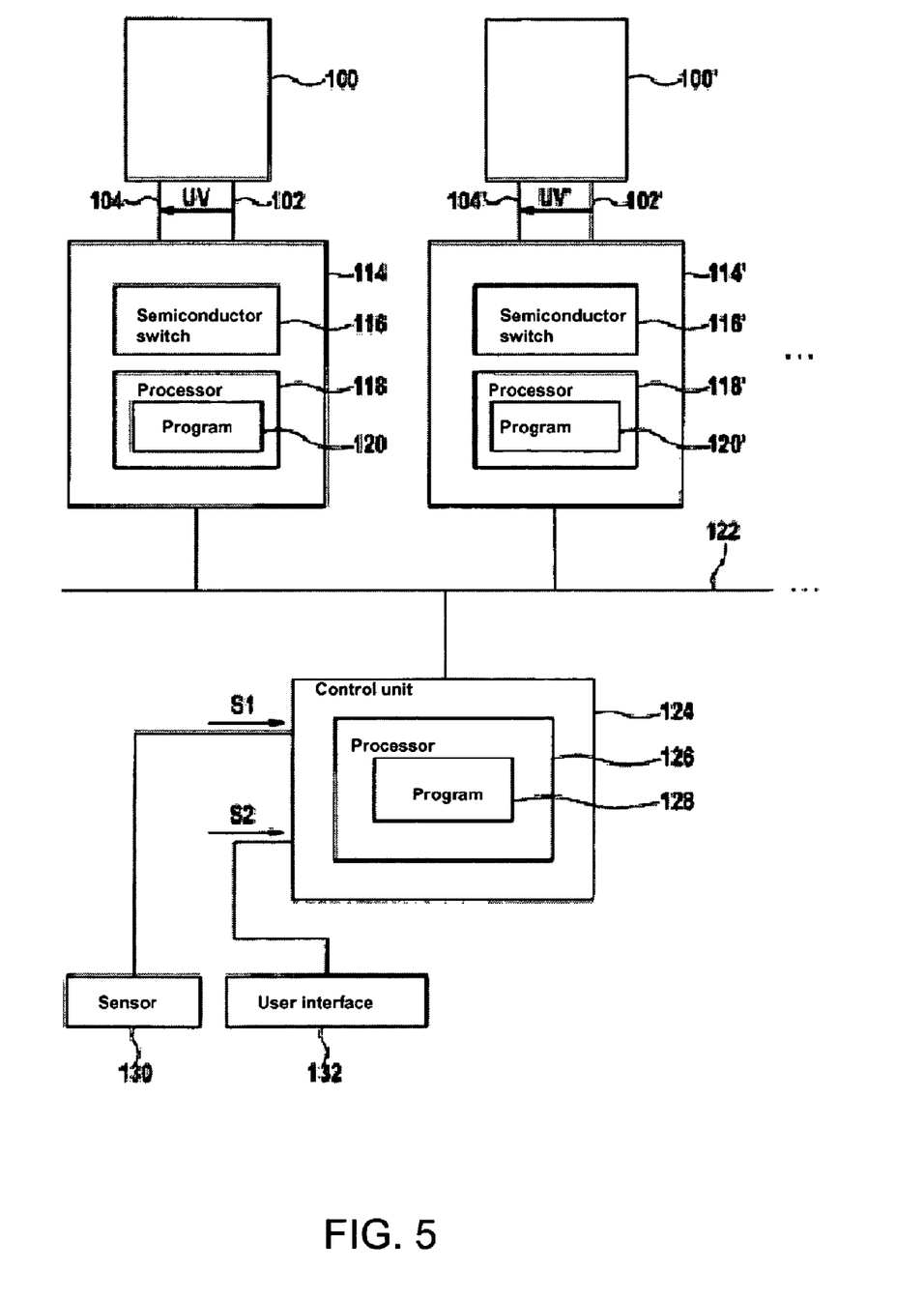
FIG. 5 shows a block diagram of an embodiment of a control system according to the invention.

FIG. 5 shows a block diagram of an embodiment of a control system according to the invention for a number of electrochromic windows 100, 100', . . . .

Each of the electrochromic windows 100, 100', . . . has a corresponding associated control device 114, 114', . . . .

The control device 114 has a semiconductor switch 116, such as for example a field-effect transistor, which corresponds to the relay 110 in the embodiments of FIGS. 1 and 2. The control device 114 also has a processor 118 for executing program instructions 120. By execution of the program instructions 120, control signals for the semiconductor switch 116 are generated, to open or close the semiconductor switch 116. A corresponding situation applies to the further control devices 114', . . . , which are in principle constructed in the same way. The control device is supplied with voltage by a voltage source (not shown in FIG. 5), as is also the case according to the embodiments of FIGS. 1 and 2.

The control devices 114, 114', . . . are connected to a control unit 124 by way of a bus 122. The control unit 124 has at least one processor 126 for executing program instructions 128.

The control unit 124 may receive a signal S1 from at least one sensor 130. The sensor 130 may be a sensor for picking up an operating state, for example of the means of transport in which the control system of FIG. 5 is fitted.

For example, the signal S1 may be a temperature signal, which is evaluated by executing the program instructions 128. If, for example, the temperature signal indicates an increased operating temperature that represents a potential hazard, the program 128 generates an emergency signal.

The sensor 130 may, however, also be formed in such a way that the signal S1 is already an emergency signal. For example, the sensor 130 is a so-called pre-crash sensor, which emits the signal S1 when there is a predicted collision of the means of transport with an obstacle.

The control unit 124 may alternatively or additionally receive a signal S2 from a user interface 132. For example, a driver of the means of transport, such as for example the pilot, may generate the signal S2 by actuating an operating element of the user interface 132, to indicate the presence of an emergency situation to the control unit 124.

If the occurrence of an emergency situation is detected by execution of the program instructions 128 on the basis of the signals S1 and/or S2 or if the signals S1 and/or S2 take the form of an emergency signal straight away, such an emergency signal is transmitted from the program 128 via the bus 122 to the control devices 114, 114', . . . .

For example, the control device 114 receives the emergency signal by execution of the program instructions 120. In response, the program instructions 120 generate an activation signal for the semiconductor switch 116, so that the latter is closed to short-circuit the connections 102 and 104, in order that the discharging current can flow, as is also the case in principle in the embodiments of FIGS. 1 and 2. In principle, the same situation applies to the further control devices 114', . . . , which likewise produce a short-circuit between the connections of the electrochromic window concerned to discharge it.

The control unit 124 may be an entirely or partially integral part of the control electronics of the means of transport.

Figure 6:
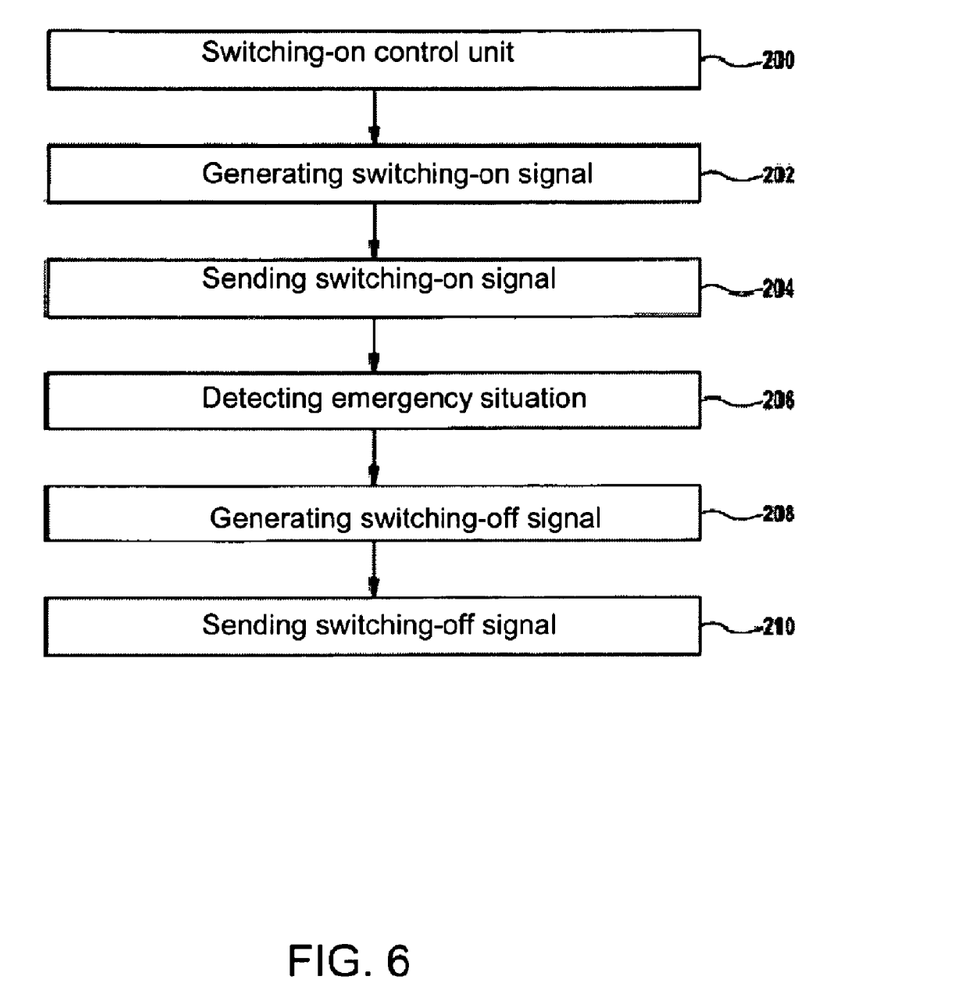
FIG. 6 shows a flow diagram of an embodiment of a method according to the invention.

FIG. 6 shows a flow diagram of an embodiment of a method according to the invention. In step 200, the control unit is switched on, for example when the means of transport is started. The control unit may carry out various test programs to test the various systems of the means of transport. Once these tests have been successfully carried out, in step 202 the control unit generates a switching-on signal, which is transmitted via the bus 122 (cf. FIG. 5) to the control devices 114 (step 204). In response, the control devices make it possible to apply supply voltages to the respective electrochromic windows, to darken them to a greater or lesser extent by the semiconductor switches being opened.

In step 206, an emergency situation is detected by the control unit; this may take place either automatically on the basis of the evaluation of various sensor signals or by a corresponding input being received. In response, in step 208, an emergency signal is generated, which is transmitted as a switching-off signal via the bus to the control devices (step 210). In response, these change their switching state in such a way that the discharging current can flow away from the windows as quickly as possible, i.e., the semiconductor switch is closed.

The invention claimed is:

1. A control device for at least one electrochromic window, comprising:
   means for generating a charging current, to bring the at least one electrochromic window from a first state into a second state, wherein the at least one electrochromic window is darker in the second state than in the first state, and
   means for discharging the at least one electrochromic window, to bring the at least one electrochromic window from the second state into the first state, wherein the discharging of the at least one electrochromic window can be triggered by an emergency signal,
   wherein the means for discharging comprise switching means, in order to interconnect first and second window regions of the at least one electrochromic window electrically in such a way that a resulting voltage for generating a discharging current for discharging the first and second window regions is greater than charging voltages of the first and second window regions, and
   wherein the resulting voltage is obtained from a sum of the charging voltages of the first and second window regions.

2. A control device for at least one electrochromic window, comprising:
   means for generating a charging current, to bring the at least one electrochromic window from a first state into a second state, wherein the at least one electrochromic window is darker in the second state than in the first state, and
   means for discharging the at least one electrochromic window, to bring the at least one electrochromic window from the second state into the first state, wherein the discharging of the at least one electrochromic window can be triggered by an emergency signal, wherein the means for discharging comprise switching means, in order to interconnect first and second window regions of the at least one electrochromic window and electrically in such a way that a resulting voltage for generating a discharging current for discharging the first and second window regions is greater than charging voltages of the first and second window regions, and wherein the first and second window regions are interconnected in an antiparallel manner.

3. A method of activating an electrochromic window, wherein the electrochromic window can reversibly go over from a first state into a second state, wherein the electrochromic window is darker in the second state than in the first state, the method comprising:

receiving an emergency signal when the electrochromic window is in the second state, and discharging the electrochromic window in order to bring the window into the first state, wherein the discharging is triggered by the emergency signal, and wherein first and second window regions of the same electrochromic window or different electrochromic windows are electrically interconnected in such a way that charging voltages of the first and second window regions add together to form a resulting voltage, wherein the resulting voltage brings about a discharging current for discharging the first and second window regions.

* * * * *